United States Patent [19]

Johansson et al.

[11] Patent Number: 4,966,616
[45] Date of Patent: Oct. 30, 1990

[54] MINERAL WOOL CENTRIFUGE

[75] Inventors: Lasse Johansson; Erik Åstrand, both of Pargas, Finland

[73] Assignee: Oy Partek AB, Pargas, Finland

[21] Appl. No.: 382,694

[22] PCT Filed: Feb. 9, 1988

[86] PCT No.: PCT/FI88/00019

§ 371 Date: Aug. 2, 1989

§ 102(e) Date: Aug. 2, 1989

[87] PCT Pub. No.: WO88/06146

PCT Pub. Date: Aug. 25, 1988

[30] Foreign Application Priority Data

Feb. 20, 1987 [FI] Finland .................................. 870712

[51] Int. Cl.⁵ .......................................... C03B 37/035
[52] U.S. Cl. .......................................... 65/14; 65/3.1; 65/8; 65/15
[58] Field of Search .......................... 65/3.1, 8, 14, 15

[56] References Cited

U.S. PATENT DOCUMENTS

| | | | |
|---|---|---|---|
| 2,398,707 | 4/1946 | Hawthorne et al. | 65/14 |
| 2,855,626 | 10/1958 | Firnhaber | 65/14 |
| 3,343,933 | 9/1967 | Mullan et al. | 65/3.1 |
| 3,622,293 | 11/1971 | Firnhaber | 65/14 |
| 4,046,539 | 9/1977 | Pitt | 65/8 X |
| 4,342,582 | 8/1982 | Porter | 65/14 |
| 4,433,992 | 2/1984 | Debouzie et al. | 65/3.1 |

Primary Examiner—Robert L. Lindsay
Attorney, Agent, or Firm—Scully, Scott, Murphy & Presser

[57] ABSTRACT

A mineral wool centrifuge which comprises a rotatable centrifuge wheel (3) for the defibration of a molten mineral material to be passed on to said centrifuge wheel; a driving motor (2) for the rotation of the centrifuge wheel; a blowing air nozzle/blowing air nozzles (6) for applying blowing air to the periphery of the centrifuge wheel for separating mineral fibres from the molten mineral material; and means (9a, 9b, 17) for applying a binder to the mineral fibres separated from the periphery of the centrifuge wheel. For achieving a compact mineral wool centrifuge, the centrifuge comprises an unrotatable body shaft (1); the driving motor (2) is fastened directly to the end face of the body shaft (1), whereby the body shaft and the driving motor form a coaxial, fixed, unrotatable whole; and a drive shaft (4) of the driving motor (2) for the rotation of the centrifuge wheel is arranged to extend through the body shaft (1) so that the end portion of the drive shaft protruding from one end of the body shaft is connected to the centrifuge wheel (3) mounted in bearings on the body shaft.

5 Claims, 1 Drawing Sheet

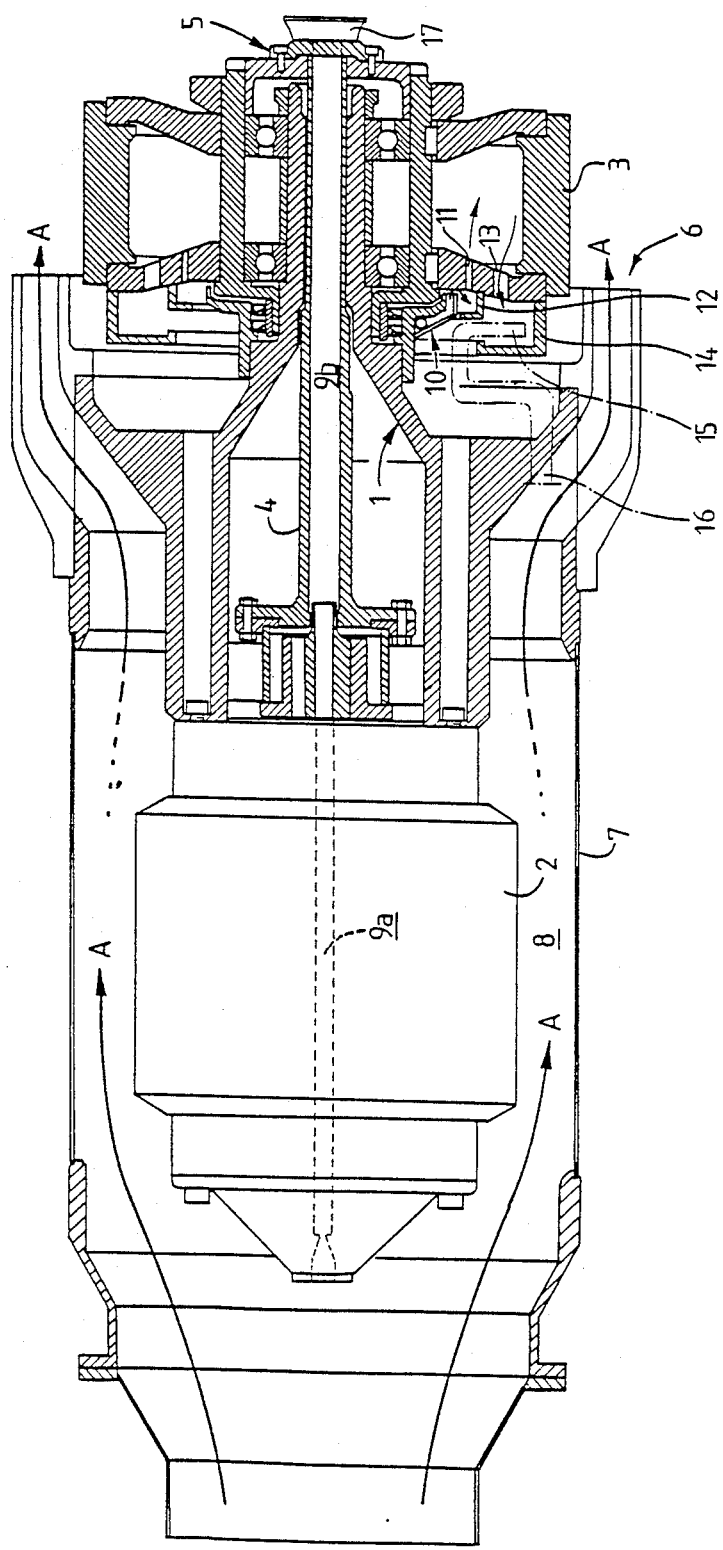

MINERAL WOOL CENTRIFUGE

The invention relates to a mineral wool centrifuge comprising a rotatable centrifuge wheel for the defibration of a molten mineral material to be passed on to said centrifuge wheel; a driving motor for the rotation of the centrifuge wheel; a blowing air nozzle blowing air nozzles for applying blowing air to the periphery of the centrifuge wheel for separating mineral fibres from the molten mineral material; and means for applying a binder to the mineral fibres separated from the periphery of the centrifuge wheel.

A conventional mineral wool centrifuge generally comprises three to four centrifuge wheels. The centrifuge wheels form a group in which each centrifuge wheel rotates in a predetermined direction, casting centrifugally molten mineral material from the periphery thereof on to the periphery of an adjacent centrifuge wheel. The entire group is placed in a carriage displaceable on rails under a melting furnace. The carriage further comprises a blower or the carriage is connected to an external blower for producing the blowing air which is passed around the centrifuge wheels in the direction of the axes thereof. By means of the blowing air, the molten mineral material is party extended into fibres and the fibres thus formed are transported into a wool chamber. Each centrifuge wheel is rotated by a separate motor by means of a V-belt drive. The motors are placed under the protective plates of the carriage.

The above-described asymmetric mineral wool centrifuge arrangement and the motors, blowers, air pipes, water cooling means for the centrifuge wheels, etc., comprised therein form a relatively large, clumsy structure. The centrifuge is heavy and thus difficult to handle. It takes plenty of space under the melting furnace and the air flow into a collecting chamber forming an extension thereof is difficult to control. In addition, this kind of mineral wool centrifuge is difficult to maintain.

The object of the present invention is to provide a new mineral wool centrifuge the shape of which in particular is improved and by means of which the above disadvantages can be avoided in a simple manner. This object is achieved by means of a mineral wool centrifuge according to the invention, which is characterized in that the centrifuge comprises an unrotatable body shaft; the driving motor is fastened directly to the end face of the body shaft, whereby the body shaft and the driving motor form a coaxial, fixed, unrotatable whole; and a drive shaft of the driving motor for the rotation of the centrifuge wheel is arranged to extend through the body shaft so that the end portion of the drive shaft protruding from one end of the body shaft is connected to the centrifuge wheel mounted in bearings on the body shaft.

The invention is thus based on the idea that each centrifuge wheel is provided with its own streamlined unit which comprises all means required for defibration and forms a small whole easy to handle so that the defibration operations can be carried out and controlled therewith more easily than previously.

The structure according to the invention enables the introduction of the blowing air to be passed around the centrifuge wheel to be effected in a new way. It is preferable to fasten the blowing air nozzle(s) to the body shaft around it, and the driving motor is surrounded by a tubular shell which extends up to the blowing air nozzle(s) so as to form an annular blowing air channel which extends past the driving motor and is connected to the blowing air nozzle(s). The defibration air advancing in the annular blowing air channel thus simultaneously cools the structures within the shell, particularly the driving motor, whereby it has been preheated when it reaches the centrifuge wheel, which is advantageous in view of the defibration.

By virtue of the unrotatable body shaft the cooling of the centrifuge wheel and the lubrication of the bearings are also easy to arrange.

In addition, the use of the mineral wool centrifuge according to the invention enables the surroundings of the melting furnace of the mineral material and the wool chamber to be planned more freely in the premises used for the production of mineral fibres.

In the following the invention will be described more closely with reference to the attached drawing, which shows a longitudinal section of a mineral wool centrifuge according to the invention.

The mineral wool centrifuge comprises an unrotatable body shaft to the face of which is directly attached a direct-coupled driving motor 2 having a speed of rotation preferably within the range from 3,000 to 10,000 r/min and a soft start-up and stop. The speed of rotation of the motor is adjusted with an AC inverter. The body shaft 1 and the driving motor 2 thus form a coaxial, fixed unrotatable whole. The centrifuge wheel 3 is mounted in bearings on the body shaft 1 at a distance from the driving motor 2 and a drive shaft 4 of the driving motor is arranged to extend through the body shaft, so that the end portion of the drive shaft protruding from one end of the body shaft is connected to the centrifuge wheel by means of a coupling 5. An annular blowing air nozzle 6 is arranged around the body shaft 1. The driving motor 2 is surrounded by a tubular shell 7 which extends up to the blowing air nozzle 6 so as to form an annular blowing air channel 8 which extends past by the driving motor and is correspondingly connected to the annular blowing air nozzle. The passage of the blowing air is illustrated by means of the arrows A. A binder feeding channel 9a, 9b is arranged to extend through the driving motor 2 and the drive shaft 4 thereof into a binder spraying apparatus 17 attached to the end face of the centrifuge wheel.

Means 10 for feeding cooling water into the centrifuge wheel 3 is fitted fixedly on the body shaft 1 adjacent to that end of the centrifuge wheel which faces the driving motor 2. The cooling water is introduced into the centrifuge wheel through channels 11 positioned at the end face thereof by means of a chute 12 extending around the end face of the centrifuge wheel, whereafter is circulated within the centrifuge wheel and discharged out of the centrifuge wheel through further channels 13 positioned at the end face of the wheel, the channels 13 being positioned at a greater radial distance from the axis of rotation of the centrifuge wheel than the channels 11. The circulation of the cooling water within the centrifuge wheel 3 takes place by means of the centrifugal force. The water to be removed is passed into a chute 14 which is similar in structure to the chute 12 and which extends around the centrifuge wheel. The cooling water is removed from the chute 14 by means of a cooling water collecting means into a cooling water return pipe 16 which is positioned in the blowing air channel 8 similarly as the feeding pipe not shown in the drawing. The circulation of the cooling water within the centrifuge wheel 3 is illustrated by arrows.

We claim:

1. A mineral wool centrifuge comprising a rotatable centrifuge wheel (3) for the defibration of a molten mineral material to be passed on to said centrifuge wheel;

a driving motor (2) for the rotation of the centrifuge wheel;

at least one blower air nozzle (6) for applying blowing air to the periphery of the centrifuge wheel for separating mineral fibres from the molten mineral material; and means (9a, 9b, 17) for applying a binder to the mineral fibres separated from the periphery of the centrifuge wheel, wherein the centrifuge comprises an unrotatable body shaft (1);

the driving motor (2) is fastened directly to the end face of the body shaft (1), whereby the body shaft and the driving motor form a coaxial, fixed, unrotatable whole; and a drive shaft (4) of the driving motor (2) for the rotation of the centrifuge wheel is arranged to extend through the body shaft (1) so that the end portion of the drive shaft protruding from one end of the body shaft is connected to the centrifuge wheel (3) mounted in bearings on the body shaft.

2. A mineral wool centrifuge according to claim 1, said at least one blowing air nozzle (6) is fastened to the body shaft (1) around the body shaft.

3. A mineral wool centrifuge according to claim 2, wherein the driving motor (2) is surrounded by a tubular shell (7) which extends up to the at least one blowing air nozzle (6) so as to form an annular blowing air channel (8) which extends past the driving motor and is connected to the blowing air nozzle, the blowing air flowing within said channel (8) simultaneously cooling the driving motor.

4. A mineral wool centrifuge according to claim 1, wherein the binder applying means (9a, 9b) is arranged to extend through the driving motor (2) and the drive shaft (4) thereof into a binder spraying means attached to the end face of the centrifuge wheel.

5. A mineral wool centrifuge according to claim 1, wherein the side of the centrifuge wheel (3) is provided with a feeding chute (12) for cooling water and feeding channels (11) for feeding cooling water into the centrifuge wheel as well as a feeding chute and discharge channels (13) positioned at a greater distance from the feeding channels in the radial direction of the central axis of the centrifuge wheel, and a discharge chute (14) for removing cooling water from within the centrifuge wheel.

* * * * *